(12) United States Patent
Gallucci et al.

(10) Patent No.: US 8,399,573 B2
(45) Date of Patent: *Mar. 19, 2013

(54) POLYMER BLEND COMPOSITIONS

(75) Inventors: Robert Russell Gallucci, Mt. Vernon, IN (US); Tara Mullen, Mt. Vernon, IN (US); Roy Odle, Mt. Vernon, IN (US); Kapil Chandrakant Sheth, Evansville, IN (US); James M. White, Niskayuna, NY (US)

(73) Assignee: SABIC Innovative Plastics IP B.V. (NL)

( * ) Notice: Subject to any disclaimer, the term of this patent is extended or adjusted under 35 U.S.C. 154(b) by 864 days.

This patent is subject to a terminal disclaimer.

(21) Appl. No.: 11/562,625

(22) Filed: Nov. 22, 2006

(65) Prior Publication Data

US 2008/0119615 A1 May 22, 2008

(51) Int. Cl.
*C08L 67/00* (2006.01)
*C08L 71/02* (2006.01)
*C08L 77/00* (2006.01)
*C08L 77/12* (2006.01)
*C08L 79/06* (2006.01)
*C08L 81/04* (2006.01)
*C08L 81/06* (2006.01)

(52) U.S. Cl. ........ 525/397; 525/417; 525/420; 525/425; 525/432; 525/436; 525/535; 525/537; 428/35.7; 428/364

(58) Field of Classification Search .................. 525/397, 525/417, 420, 425, 432, 436, 535, 537; 428/35.7, 428/364
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 3,028,365 A | 4/1962 | Schnell et al. |
| 3,065,205 A | 11/1962 | Bonner, Jr. |
| 3,148,172 A | 9/1964 | Fox |
| 3,153,008 A | 10/1964 | Fox |
| 3,271,367 A | 9/1966 | Schnell et al. |
| 3,271,368 A | 9/1966 | Goldberg et al. |
| 3,383,092 A | 5/1968 | Cazier |
| 3,671,487 A | 6/1972 | Abolins |
| 3,723,373 A | 3/1973 | Lucas |
| 3,787,364 A | 1/1974 | Wirth et al. |
| 3,803,085 A | 4/1974 | Takehoshi et al. |
| 3,814,869 A | 6/1974 | De Luca |
| 3,825,629 A | 7/1974 | Hofer et al. |
| 3,847,867 A | 11/1974 | Heath et al. |
| 3,847,869 A | 11/1974 | Williams, III |
| 3,850,885 A | 11/1974 | Takekoshi et al. |
| 3,852,242 A | 12/1974 | White |
| 3,855,178 A | 12/1974 | White et al. |
| 3,905,942 A | 9/1975 | Takekoshi et al. |
| 3,917,643 A | 11/1975 | Takekoshi et al. |
| 3,962,175 A | 6/1976 | Hofer et al. |
| 3,972,902 A | 8/1976 | Heath et al. |
| 3,983,093 A | 9/1976 | Williams, III et al. |
| 4,075,163 A | 2/1978 | Hofer et al. |
| 4,154,775 A | 5/1979 | Axelrod |
| 4,175,175 A | 11/1979 | Johnson et al. |
| 4,176,222 A | 11/1979 | Cinderey et al. |
| 4,217,438 A | 8/1980 | Brunelle et al. |
| 4,396,755 A | 8/1983 | Rose |
| 4,398,020 A | 8/1983 | Rose |
| 4,443,591 A | 4/1984 | Schmidt et al. |
| 4,455,410 A | 6/1984 | Giles, Jr. |
| 4,468,506 A | 8/1984 | Holub et al. |
| 4,689,391 A | 8/1987 | Peters et al. |
| 4,835,249 A | 5/1989 | Gallagher et al. |
| 4,847,311 A | 7/1989 | Yamaya et al. |
| 4,910,288 A | 3/1990 | Dellacoletta |
| 4,965,337 A | 10/1990 | Peters et al. |
| 5,079,309 A | 1/1992 | Harris et al. |
| 5,091,028 A * | 2/1992 | Yamazaki et al. ............ 156/172 |
| 5,171,796 A | 12/1992 | Harris et al. |
| 5,229,482 A | 7/1993 | Brunelle |
| 5,260,407 A | 11/1993 | Saruwatari et al. |
| 5,298,331 A | 3/1994 | Kanakarajan et al. |
| 5,324,475 A | 6/1994 | Okahashi et al. |
| 5,331,063 A | 7/1994 | Pater et al. |
| 5,460,890 A | 10/1995 | Okahashi et al. |
| 5,633,319 A | 5/1997 | Silvi et al. |
| 5,705,574 A | 1/1998 | Lubowitz et al. |
| 5,830,974 A | 11/1998 | Schmidhauser et al. |
| 6,103,806 A | 8/2000 | Kido et al. |
| 6,187,874 B1 | 2/2001 | Yoshioka et al. |

(Continued)

FOREIGN PATENT DOCUMENTS

| | | |
|---|---|---|
| EP | 1498909 | 1/2005 |
| JP | 8-143667 | * 6/1996 |

(Continued)

OTHER PUBLICATIONS

International Search Report for International Application No. PCT/US2007/075809, mailed Jan. 7, 2008, 5 pages.

(Continued)

*Primary Examiner* — Ana Woodward
(74) *Attorney, Agent, or Firm* — Cantor Colburn LLP; Diderico van Eyl

(57) ABSTRACT

Thermoplastic compositions having miscible and compatible immiscible polymer blends are disclosed. The miscible polymer blends have a single glass transition temperature. The compatible polymer blends have two glass transition temperatures.

31 Claims, 1 Drawing Sheet

U.S. PATENT DOCUMENTS

| | | |
|---|---|---|
| 6,458,912 B1 | 10/2002 | Kuroki et al. |
| 6,476,177 B2 | 11/2002 | Auman et al. |
| 6,548,180 B2 | 4/2003 | Yamamoto et al. |
| 6,849,706 B1 | 2/2005 | Brunelle et al. |
| 6,919,422 B2 | 7/2005 | Gallucci et al. |
| 2004/0249117 A1 | 12/2004 | Acar et al. |
| 2004/0260055 A1 | 12/2004 | Gallucci et al. |
| 2005/0070684 A1 | 3/2005 | Gallucci et al. |
| 2005/0112362 A1 | 5/2005 | Yen-huey et al. |
| 2005/0149390 A1 | 7/2005 | Scholl et al. |
| 2007/0066740 A1 | 3/2007 | Odle et al. |

FOREIGN PATENT DOCUMENTS

| | | |
|---|---|---|
| WO | 2006091481 | 8/2006 |

OTHER PUBLICATIONS

Written Opinion for International Application No. PCT/US2007/075809, mailed Jan. 7, 2008, 6 pages.

International Search Report for International Application No. PCT/US2007/075812, mailed May 7, 2008, 5 pages.

Written Opinion for International Application No. PCT/US2007/075812, mailed May 7, 2008, 5 pages.

ASTM D638, Standard Test Method for Tensile Properties of Plastics, 15 pages.

ASTM D648, Standard Test Method for Deflection Temperature of Plastics Under Flexural Load in the Edgewise Position, 12 pages.

Chao, A P NMR study of poly(phenylene oxide) (PPO)(1) resin's hydroxyl end groups, Polymer Bulletin 17, 1987, 397-401.

Kreuz, et al., Studies of Thermal Cyclizations of Polyamic Acids and Tertiary Amine salts, Journal of Polymer Science, Part A-1, 1966, vol. 4, 2607-2616.

Kim, et al., Kinetic and Mechanistic Investigations of the Formation of Polyimides under Homogenous Conditions, Macromolecules, 1993, vol. 26, 1344-1358.

Chan, et al, Facile Quantative Analysis of Hydroxyl End Groups of Poly(2,6-dimethyl-1,4-phenylene oxide)s by P NMR Spectroscopy, Macromolecules, 1994, 27, 6371-6375.

JP08239645 Abstract; Sep. 17, 1996; 1 page.

JP58007449; Jan. 17, 1983; 1 page.

International Search Report for International Application No. PCT/US2007/075993; Mailed Nov. 13, 2007; 5 pages.

Written Opinion for International Application No. PCT/US2007/075993; Mailed Nov. 13, 2007; 6 pages.

\* cited by examiner

POLYMER BLEND COMPOSITIONS

BACKGROUND OF THE INVENTION

Compositions having a polymer blend are disclosed herein.

Polymer blends are widely employed in a range of applications. For example, substitution of metal parts with parts made from plastic materials (polymer compositions) results in parts having lighter weight and similar or improved performance properties. In many applications, such as parts used under an automobile hood, plastic materials with a high heat resistance are required. Frequently though, plastic materials having a high heat resistance are difficult to mold. Blending polymers is one approach to achieving a plastic material with a desired set of physical properties such as high heat resistance and processability. Polymer blends may comprise miscible polymers, immiscible polymers, or a combination of miscible and immiscible polymers. Blends comprising immiscible polymers have two or more phases and such blends may be compatible or incompatible. Incompatible blends of immiscible polymers can suffer from phase separation as demonstrated by delamination or the formation of skin-core layered structures during polymer processing operations, especially injection molding. The term, "delamination," as used when referring to such materials, describes visually observed separation of a surface layer giving a flaking or onion skin effect. Incompatibility may also result in poor mechanical properties and marginal surface appearance (streaking, pearlescence, etc.). Compatible blends of immiscible polymers typically do not show any delamination and can result in acceptable end-use properties.

Miscible polymer blends, on the other hand, may offer desirable end-use properties and the advantage of tailoring product properties intermediate of the individual components across the miscible composition range. Miscible blends do not suffer from delamination and generally have consistent physical properties.

So while a miscible blend of two polymers is generally desirable it can be difficult to achieve. Blends of two polymers of a same or similar class might be expected to have a better chance of miscibility. However, polymers from the same class are frequently immiscible and form multiphasic compositions. For example, ACUDEL 2000 from Solvay is an immiscible blend of two polysulfones—PPSU and PSU. In addition, many such examples of immiscible blends of polymers in the same class exist in the literature. Thus, polymer miscibility is difficult to predict, even within the same class of polymers.

For the foregoing reasons there remains an unmet need for non-delaminated polymer blends, i.e., blends free of delamination, which are either miscible blends or immiscible, but nonetheless compatible, blends. More particularly, there remains an unmet need to develop blends having high heat resistance, and methods of forming such polymer blends.

BRIEF DESCRIPTION OF THE INVENTION

The invention includes thermoplastic compositions comprising a non-delaminated polymer blend. The polymer blend is derived from a pre-polymer and a polymer. The a pre-polymer comprises a component selected from the group consisting of free amine groups, free anhydride groups, and combinations thereof, and further comprises structural units derived from a dianhydride and a diamine. The polymer comprises a reactive member selected from the group consisting of structural groups, end groups, and combinations thereof. The reactive member is reactive with the free anhydride groups, the free amine groups, or combinations thereof. The polymer blend is non-delaminated.

The polymer may comprise structural units derived from a dianhydride and a diamine. In embodiments where the pre-polymer and polymer employ a common diamine or dianhydride the polymer blend has a single glass transition temperature. In embodiments where the pre-polymer and the polymer employ different diamines and dianhydrides the polymer blend has greater than one glass transition temperatures but does not show delamination after aging at 280° C. for 240 hours.

In some embodiments the polymer may comprise structural units derived from bisphenol-A dianhydrides and diamino diaryl sulfones and the pre-polymer comprises structural units derived from oxydiphthalic anhydrides and diamino diaryl sulfones. In one embodiment the polymer blend has a single glass transition temperature. In one embodiment the polymer blend has greater than one glass transition temperature but does not show delamination after aging at 280° C. for 240 hours.

In one embodiment a composition comprises a polymer blend derived from a pre-polymer and a polyetherimide polymer. The pre-polymer comprises a component selected from the group consisting of free amine groups, free anhydride groups, and combinations thereof, and further comprises structural units derived from oxydiphthalic anhydride and diamino diaryl sulfone. The polyetherimide polymer comprises a reactive member selected from the group consisting of structural groups, end groups, and combinations thereof and further comprises structural units derived from bisphenol-A dianhydride and diamino diaryl sulfone. The composition further comprises a stabilizer selected from the group consisting of antioxidants, phosphites, and combinations thereof. The polymer blend has a heat deflection temperature greater than or equal to 200° C. according to ASTM D648; a tensile strength greater than or equal to 90 megaPascals according to ASTM D638; and a coefficient of thermal expansion of less than or equal to 60 ppm/° C. from 30° C.-200° C. as measured by thermal mechanical analysis with a thermal ramp rate of 5° C./minute. Prior to the formation of the polymer blend the pre-polymer is present an amount of 50 to 95 weight percent and the polyetherimide polymer is present in an amount of 5 to 50 weight percent, based on the combined weight of the pre-polymer and the polymer.

DETAILED DESCRIPTION OF THE INVENTION

Figure 1:
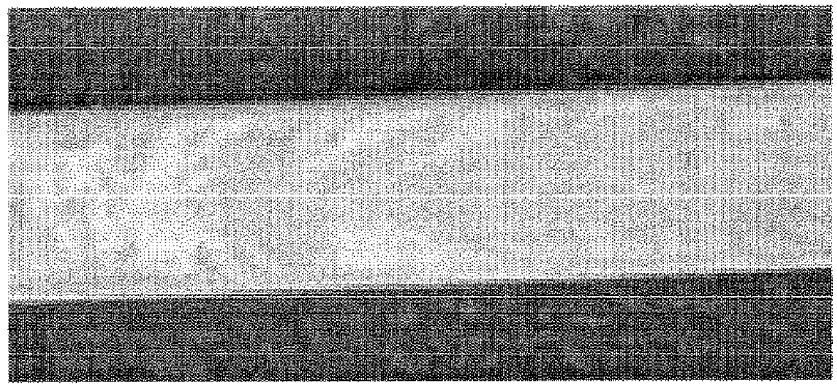
FIG. 1 is a photograph of a sample showing delamination.

The invention is based on the unexpected discovery that it is now possible to form non-delaminated compositions that are derived from (a) pre-polymers having free amine groups and/or free anhydride groups and (b) a polymers having structural groups and/or end groups that are reactive with the pre-polymer's free anhydride groups and/or free amine groups. Surprisingly, the compositions (and articles derived from the compositions) can overcome the problem of delamination typically found in immiscible, incompatible blends. Compositions (and articles derived from the compositions) can also exhibit improved miscibility and increase the range of miscible blend compositions.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The definition of benzylic proton is well known in the art, and as used herein it encompasses at least one aliphatic carbon atom chemically bonded directly to at least one aromatic ring, such as a phenyl or benzene ring, wherein said aliphatic carbon atom additionally has at least one proton directly bonded to it.

As used herein "substantially free of benzylic protons" or "essentially free of benzylic protons" means that the pre-polymer, such as for example a polyimide sulfone pre-polymer, has less than about 5 mole % of structural units, in some embodiments less than about 3 mole % structural units, and in other embodiments less than about 1 mole % structural units containing benzylic protons. "Free of benzylic protons", which are also known as benzylic hydrogens, means that the pre-polymer contains zero mole % of structural units derived from monomers and end cappers containing benzylic protons or benzylic hydrogens. The amount of benzylic protons can be determined by ordinary chemical analysis based on the chemical structure. In one embodiment the polymer blend is essentially free of benzylic protons.

The term "alkyl" is intended to include both $C_{1-30}$ branched and straight-chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n-and s-heptyl, and, n- and s-octyl. The term "aryl" is intended to mean an aromatic moiety containing the specified number of carbon atoms, such as, but not limited to phenyl, tropone, indanyl or naphthyl.

All ASTM tests are based on the 2003 edition of the Annual Book of ASTM Standards unless otherwise indicated.

The term "polymer blend" as used herein means a macroscopically homogeneous mixture of two or more different polymers. The term "miscible blend" describes a polymer blend having a single glass transition temperature ($T_g$) and a monophasic resin morphology as determined by transmission electron microscopy at a magnification of fifteen thousand (15,000). "Delamination" describes the separation of a surface layer from the body of an article molded from a polymer composition. The presence or absence of delamination can be determined by visual inspection (20/20 vision) at a distance of one half (½) meter as described in greater detail below.

A "compatible" polymer blend is an immiscible polymer blend that exhibits macroscopically uniform physical properties throughout its whole volume, has more than one glass transition temperature ($T_g$), and shows multiphasic resin morphologies when viewed by electron microscopy as described above, but shows no delamination.

The term "non-delaminated" refers to the property of a composition or an article derived from the composition, in which the article or the composition does not exhibit visually observed separation of a surface layer showing a flaking or onion skin effect. A non-delaminated article may also be referred to herein as "essentially free from delamination."

Figure 2:
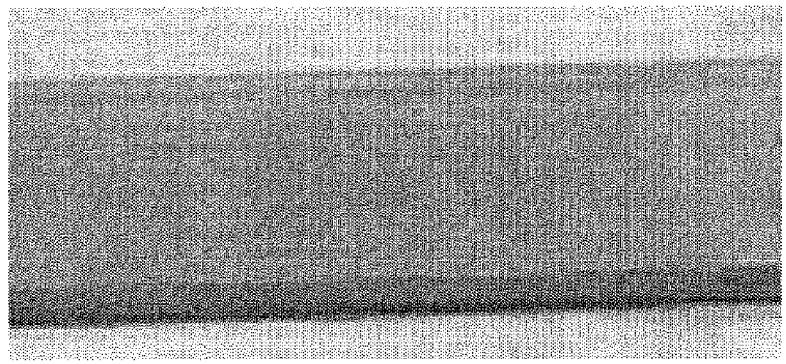
FIG. 2 is a photograph of a sample essentially free from delamination.

"Essentially free from delamination" is defined as showing no delamination by visual inspection. In one embodiment, the specimen used for inspection is an injection molded bar. A specimen showing delamination is shown in FIG. 1. A specimen essentially free from delamination is shown in FIG. 2. "Visual inspection" is determined by unaided vision (e.g., 20/20 vision in the absence of any magnifying device with the exception of corrective lenses necessary for normal eyesight) at a distance of one half (½) meter.

The "pre-polymer" is an incompletely imidized oligomer comprising structural units derived from a dianhydride and a diamine. Exemplary dianhydrides have the formula (I)

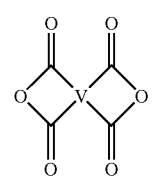

(I)

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of formula (II), such as:

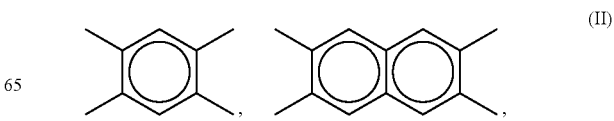

(II)

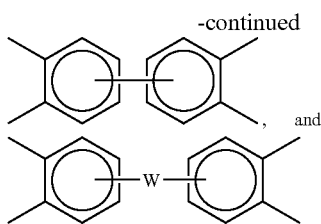

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the formula —O-Z-O— wherein the divalent bonds of the —O— or the —O-Z-O— group are in the 3,3', 3,4', 4,3', or the 4,4' positions, and wherein Z includes, but is not limited to, divalent moieties of formula (III).

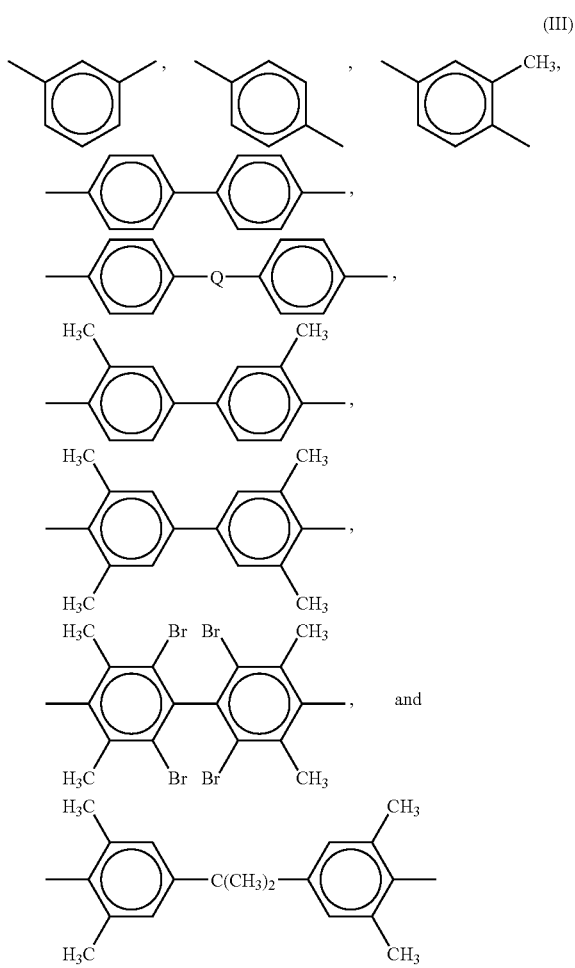

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens. In some embodiments groups free of benzylic protons are used as the resulting pre-polymer (as well as the polymer blend) can have superior melt stability.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride (bisphenol-A dianhydride); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2, 2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing. In one embodiment the dianhydride is selected from the group consisting of oxydiphthalic anhydrides, bisphenol-A dianhydrides and combinations thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

Useful diamines have the formula:

$$H_2N-R^{10}-NH_2 \quad (IV)$$

wherein R$^{10}$ is a substituted or unsubstituted divalent organic moiety such as: an aromatic hydrocarbon moiety having 6 to 20 carbons and halogenated derivatives thereof; straight or branched chain alkylene moiety having 2 to 20 carbons; cycloalkylene moiety having 3 to 20 carbon atom; or divalent moieties of the general formula (V)

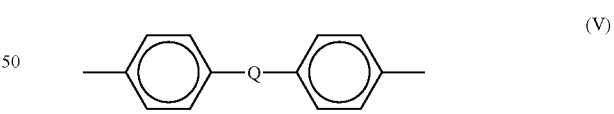

(V)

wherein Q is defined as above. Examples of specific organic diamines are disclosed, for example, in U.S. Pat. Nos. 3,972, 902 and 4,455,410. Exemplary diamines include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be used. In one embodiment the diamine is an aromatic diamine, or, more specifically, m-phenylenediamine, p-phenylenediamine, sulfonyl dianiline and mixtures thereof. In one embodiment the diamine is selected from the group consisting of diamino diaryl sulfones, metaphenylene diamines, paraphenylene diamines, and combinations thereof.

In some embodiments the pre-polymer is a polyetherimide pre-polymer comprising structural units derived from oxydiphthalic anhydride (ODPA) and diamino diaryl sulfone (DAS). Oxydiphthalic anhydride has the general formula (VI):

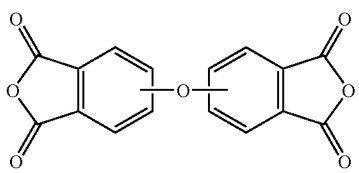

(VI)

and derivatives thereof as further defined below.

The oxydiphthalic anhydrides of formula (VI) includes 4,4'-oxybisphthalic anhydride, 3,4'-oxybisphthalic anhydride, 3,3'-oxybisphthalic anhydride, and any mixtures thereof. For example, the oxydiphthalic anhydride of formula (VI) may be 4,4'-oxybisphthalic anhydride having the following formula (VII):

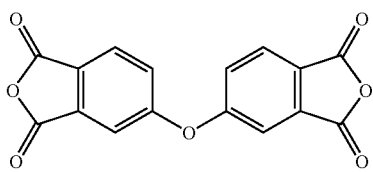

(VII)

The term oxydiphthalic anhydrides includes derivatives of oxydiphthalic anhydrides which may also be used to make the pre-polymer. Examples of oxydiphthalic anhydride derivatives which can function as a chemical equivalent for the oxydiphthalic anhydride in polyetherimide forming reactions include oxydiphthalic anhydride derivatives of the formula (VIII)

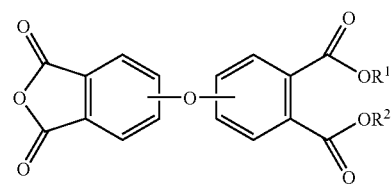

(VIII)

wherein $R^1$ and $R^2$ of formula VIII can be, independently at each occurrence, any of the following: hydrogen; a $C_1$-$C_8$ alkyl group; an aryl group. $R^1$ and $R^2$ can be the same or different to produce an oxydiphthalic anhydride acid, an oxydiphthalic anhydride ester, and an oxydiphthalic anhydride acid ester.

Derivatives of oxydiphthalic anhydrides may also be of the following formula (IX):

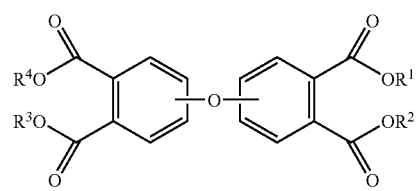

(IX)

wherein $R^1$, $R^2$, $R^3$, and $R^4$ of formula (IX) can be, independently at each occurrence, any of the following: hydrogen; a $C_1$-$C_8$ alkyl group, an aryl group. $R^1$, $R^2$, $R^3$, and $R^4$ can be the same or different to produce an oxydiphthalic acid, an oxydiphthalic ester, and an oxydiphthalic acid ester.

Diamino diaryl sulfones (DAS) have the general formula (X):

$$H_2N-Ar^1-SO_2-Ar^2-NH_2 \quad (X)$$

wherein $Ar^1$ and $Ar^2$ independently are an aryl group containing a single or multiple rings. Several aryl rings may be linked together, for example through ether linkages, sulfone linkages or more than one sulfone linkages. The aryl rings may also be fused. In one embodiment $Ar^1$ and $Ar^2$ independently comprise 5 to 12 carbons. In one embodiment $Ar^1$ and $Ar^2$ are both phenyl groups.

In one embodiment, the pre-polymer is an ODPA/DAS polyetherimide comprising more than 1, specifically 10 to 1000, or, more specifically, 30 to 500 structural units of formula (XI):

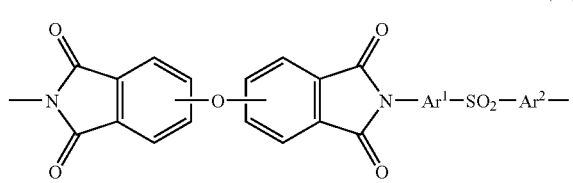

(XI)

wherein $Ar^1$ and $Ar^2$ are defined as above.

In one embodiment, the pre-polymer has a total reactive end group concentration of 0.5 to 20 mole % resin. Reactive end groups are defined as anhydrides and their chemical equivalents and amines. In some embodiments, a pre-polymer has a weight average molecular weight of 1,000 to 100,000 grams per mole (g/mole) as measured by gel permeation chromatography (GPC).

The pre-polymer can have different ratios of carbon (C) atoms to non-carbon atoms such as nitrogen (N), oxygen (O), and sulfur (S). For instance, in one embodiment, the pre-polymer can have a ratio of C atoms/N+O+S atoms of 2.8 to 4.2. In one embodiment, the number of oxygen atoms is greater than or equal to 2.5 times the number of nitrogen atoms. In another embodiment, the number of oxygen atoms is 2.5 to 5.0 times more than the number of nitrogen atoms. In another embodiment, the number of oxygen atoms is greater than or equal to 7 times the number of sulfur atoms. In another embodiment, the number of oxygen atoms is 7 to 10 times the number of sulfur atoms.

The pre-polymer may be made by any suitable process, such as the process described in U.S. Pat. No. 4,835,249. In this method, reactant monomers are dissolved in a solvent and then polymerized to an extent where the polymer precipitates from solution and can eventually be isolated by filtration or other related separation technique.

When the pre-polymer is an ODPA/DAS pre-polymer the pre-polymer is made using a slurry/precipitation method comprising stirring a diamine and a dianhydride in a solvent to form a slurry, heating the slurry to a temperature sufficient for the diamine and dianhydride to react wherein the temperature is below the melting point of the dianhydride, below the melting point of the diamine, or below the melting points of the dianhydride and diamine, and reacting the diamine and dianhydride to form a polyetherimide having sufficient molecular weight to precipitate from the solvent.

In the above process, it is important that the reaction temperature is kept below the melting point of the minimally soluble monomers so that the polymers precipitate as fine powder from the slurry that is easily stirred. It can be useful to remove water, or other volatile by-products from the reaction mixture by distillation or other means. In one embodiment azeotropic distillation of water is employed. In some embodiments water can be removed by chemical absorption using, for example, molecular sieves. In other instances water can be removed using a stream of a gas, for example nitrogen, passing over or through the reaction mixture. In addition, a combination of two or more water removal methods may be employed.

In one embodiment, the polymerization is conducted entirely below the melting point of the minimally soluble monomer(s). This may be useful when the boiling point temperature of the solvent and the melting point of the minimally soluble monomer(s) are greater than 100° C., to allow removal of water from the polymerization reaction at atmospheric pressure.

It can be useful to conduct the polymerization under pressure, for example at 1 to 300 pounds per square inch (psi) (21.1 kilograms force per square centimeter (kgf/cm$^2$)), or, more specifically, 1 psi (0.070 kgf/cm$^2$) to 100 psi (7.0 kgf/cm$^2$). This can be done for a variety of reasons, one being to raise reaction temperature and increase the rate of imidization. In order to prevent sticking or clumping of the precipitated polymer it is still important to maintain temperature below the melting point of the minimally soluble monomer(s) even when pressure is increased. In some embodiments, it may be useful to remove water from the reaction while pressure is maintained at atmospheric pressure. In some embodiments it can be useful to remove water in a multi step process employing pressures greater than or equal to atmospheric pressure.

After the consumption of equal to or greater than 50 weight percent (wt %) of the initial charge of the monomers it can be useful in some embodiments to isolate the precipitated polymer. In other embodiments the precipitated polymer may be isolated when equal to or greater than 90 wt % of the initial charge of monomers are consumed. This can be done using a variety of methods, for example, filtration, centrifugation, floatation, freeze-drying, and combinations comprising one or more of the foregoing methods. In some embodiments equal to or greater than 95 wt % of the isolated precipitated polyetherimide, based on the total weight of the isolated precipitated polyetherimide, passes through a 2 millimeter (mm) mesh screen. In some embodiments the isolated precipitated polyetherimide is a free flowing powder with an average particle size of 10 to 5000 micrometers.

The solvent used to form the slurry is chosen such that one or more of the initial monomers is minimally soluble. "Minimally soluble" is defined as 1 to 50 wt % of the monomer is undissolved at the start of the reaction (at the initial reaction conditions). In addition, the solvent should be chosen such that the resultant polymer is largely insoluble, that is to have a polymer solubility of less than or equal to 10 wt %, or, even more specifically, less than or equal to 5 wt %, or, even more specifically, less than or equal to 1 wt %. In some embodiments the solvent comprises an aprotic polar solvent. In some embodiments, the solvent is insoluble in water, that is less than or equal to 5 wt %, or, more specifically, less than or equal to 1 wt %, based on the total amount of solvent, of the solvent dissolves in an equal amount of water at room temperature. In some embodiments, the solvent has a high auto ignition temperature, for example greater than or equal to 70° C., to reduce the potential fire hazard during the process and during any subsequent isolation.

In addition, a solvent free of nitrogen atoms, phosphorus atoms, sulfur atoms or a combination comprising two or more of the foregoing may be useful in some embodiments. Solvents without these more polar atoms may be easier to remove from the polymer and being less effective solvents are more likely to have monomers and polymers that are minimally soluble or insoluble.

Examples of useful solvents for forming the pre-polymer include halogenated aromatics, such as chlorobenzene, dichlorobenzene, trichlorobenzene and bromobenzene; aryl ethers such as phenetole, anisole and veratrole; alkylaromatics such as xylenes and toluene; nitro aromatics such as nitrobenzene; polyaryl species such as naphthylene and alkyl substituted fused aromatic systems; aryl sulfone; high molecular weight alkane compounds such as mineral oils; and combinations comprising one or more of the foregoing solvents. In some embodiments the solvent or combination of solvents has an atmospheric boiling point of 150 to 250° C.

The reaction to form the pre-polymer may be run at any level of reactants versus solvent. In some instances the weight % solids can be 5 to 50% by weight of reactants to solvent at the start of the polymerization reaction. In other instances, concentrations of 15 to 40% by weight may be useful. In still other instances higher concentrations of reactants to solvent may be used to gain reactor efficiency.

Polyetherimide pre-polymer may be made using the precipitative process by reaction of more or less equal molar amounts of dianhydride (or chemical equivalent of a dianhydride) with a diamine. In some embodiments the amount of dianhydride and diamine differ by less than 5 mole %; this helps to give polymers of sufficient molecular weight (Mw), for example greater than or equal to 1,000 g/mol, to precipitate from the reaction medium and have useful mechanical properties such as stiffness, impact strength and resistance to tearing or cracking.

Polyetherimide polymers and polyetherimide pre-polymers may have varying levels of amine and anhydride end groups depending on the amounts of diamine and dianhydride used in the polymerization reaction and the degree of completeness of the polymerization reaction. A variety of amine, anhydride, and anhydride derivatives such as carboxylic acids, carboxylate salts, amide-acids and amide-carboxylate salts are examples of possible end groups. As used herein it will be understood that the term "amine end groups" comprises end groups that are amines, and any related end groups that are derived from amine end groups. As used herein it will also be understood that the term "anhydride end groups" comprises end groups which are anhydrides and anhydride derivatives such as carboxylic acid, carboxylate salts, amide-acids and amide-carboxylate salts. All types, more than one type or essentially one type of these end groups may be present. In general, total reactive end group concentrations of a polyetherimide can be 0.05 to 0.3 mole % resin. In contrast, the total reactive end group concentrations of a pre-polymer can be 0.5 to 20 mole %. As used herein, the term "reactive end group" refers to any of the various possible end groups that can give rise to volatile species during melt processing. Most reactive end groups will be amine or anhydride. In one embodiment, the pre-polymer has a total reactive end group content of 1 to 10 mole %, or, more specifically, 5 to 10 mole %.

The concentration of amine, anhydride, and related end groups can be analyzed by various titration and spectroscopic methods well known in the art. Spectroscopic methods include infrared, nuclear magnetic resonance, Raman spectroscopy, and fluorescence. Examples of infrared methods are described in J. A. Kreuz, et al., and J. Poly. Sci. Part A-1, vol. 4, pp. 2067-2616 (1966). Examples of titration methods are described in Y. J. Kim, et al., Macromolecules, vol. 26, pp. 1344-1358 (1993). It may be advantageous to make derivatives of polymer end groups to enhance measurement sensitivity using, for example, variations of methods as described in K. P. Chan et al., Macromolecules, vol. 27, p. 6731 (1994) and J. S. Chao, Polymer Bull., vol. 17, p. 397 (1987).

The molecular weight of pre-polymer can be measured by gel permeation chromatography (GPC). The molecular weights as used here refer to the weight average molecular weight (Mw). In one embodiment, the pre-polymer has a weight average molecular weight of 1,000 to 100,000 grams per mole (g/mole) as measured by gel permeation chromatography (GPC). In some embodiments the Mw can be 2,000 to 20,000.

The polymer comprises end groups reactive with anhydride, amine or a combination thereof under melt mixing conditions. Exemplary endgroups include and are not limited to amine, anhydride, hydroxyl, alcohol, amide, epoxide, ester, thiol, acid and activated aromatic halide, and combinations thereof. Exemplary polymers include polyimides, polyetherimides, polyamideimides, polyaryl ether ketones, polyaryl ketones, polyether ketones, polyether ether ketones, polyaryl sulfones, liquid crystal polymers, polyamides, polyesters, polysulfones, polyphenylene sulfides, polybenzimidazoles, polyphenylenes, and combinations thereof. The foregoing exemplary polymers are commercially available e.g., Aurum polyimides (Mitsui), ULTLEM polyetherimides (GE), PEEK (Victrex), Radel polysulfones (Solvay) and Fortron PPS (Ticona).

The polymer may be a polyetherimide derived from the dianhydrides and diamines described above. In some embodiments, the polymer is a polyetherimide comprising structural units derived from bisphenol-A dianhydride (BPADA) and diamino diarylsulfone (DAS). Bisphenol-A dianhydride has the following formula (XII):

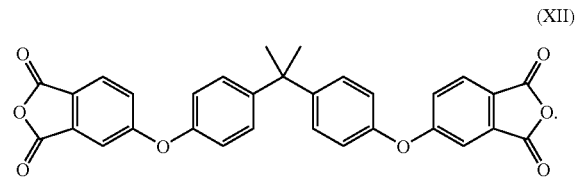

(XII)

Similar to the discussion above with regard to oxydiphthalic anhydride, the term "bisphenol-A dianhydride" is inclusive of chemical derivatives of the anhydride functionality which can function as a chemical equivalent for the bisphenol-A dianhydride in polyetherimide forming reactions.

In one embodiment the diamino diaryl sulfone is diamino diphenyl sulfone.

In one embodiment, the polymer is a BPADA/DAS polyetherimide comprising more than 1, or, specifically 10 to 1000, or, more specifically, 30 to 500 structural units of the formula (XIII):

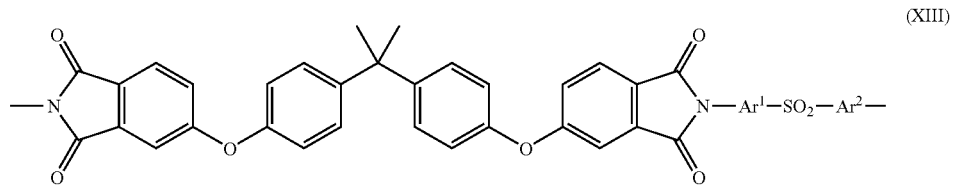

(XIII)

The polyetherimide can have a weight average molecular weight (Mw) of 5,000 to 100,000 grams per mole (g/mole) as measured by gel permeation chromatography (GPC). In some embodiments the Mw can be 10,000 to 80,000.

In some embodiments the polymer is a polyetherimide derived from bisphenol-A dianhydride (BPADA) and phenylene diamine (PD) (a BPADA/PD polyetherimide). More specifically, the structural units can be derived from bisphenol-A dianhydride (BPADA) and meta-phenylene diamine (MPD), BPADA and para-phenylene diamine (PPD), or combinations thereof.

Meta-phenylene diamine (MPD) has the following formula (IX):

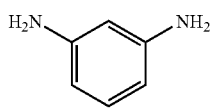

(IX)

Para-phenylene diamine (PPD) has the following formula (XI):

(XI)

The BPADA/PD polyetherimide comprises more than 1, or, specifically 10 to 1000, or, more specifically, 30 to 500 structural units of the formula (X), formula (XII) or a combination thereof:

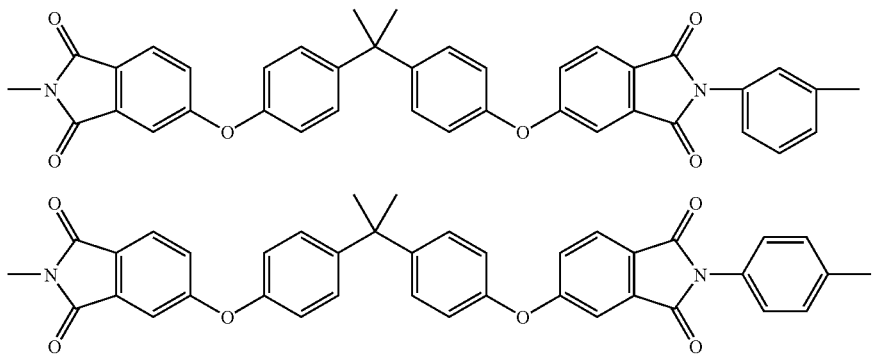

In embodiments where the polymer is a polyetherimide, the polyetherimide may be made using any suitable method known in the art. In one embodiment, a method using a highly polar solvent that dissolves both the reactant monomers and the resultant polymers can be used. Solvents such as dimethyl formamide (DMF), dimethyl acetamide (DMAC), N-methyl pyrrolidinone (NMP), hexamethyl phosphoramide (HMPA) and dimethyl sulfoxide (DMSO) can be used in this method. The resultant polymers are totally dissolved and can be isolated from solution by removal of solvent as part of a film casting or other evaporative process or by precipitation using an anti-solvent such as methanol.

The compositions described herein may further contain fillers, reinforcements, additives, and combinations thereof. Exemplary fillers and reinforcements include fiber glass, milled glass, glass beads, flake and the like. Minerals such as talc, wollastonite, mica, kaolin or montmorillonite clay, silica, quartz, barite, and combinations of two or more of the foregoing may be added. The compositions can comprise inorganic fillers, such as, for example, carbon fibers and nanotubes, metal fibers, metal powders, conductive carbon, and other additives including nano-scale reinforcements as well as combinations of inorganic fillers.

Other additives include, UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

In some embodiments, the compositions may further include second polymer. Examples of such polymers include and are not limited to PPSU (polyphenylene sulfone), PEI (poly(ether imide)), PSU (polysulfone), PC (polycarbonate), PPE (polyphenylene ether), PMMA (poly methyl methacrylate), ABS (acrylonitrile butadiene styrene), PS (polystyrene), PVC (polyvinylchloride), PFA (per fluoro alkoxy alkane), MFA (co-polymer of TFE tetra fluoro ethylene and PFVE perfluorinated vinyl ether), FEP (Fluorinated ethylene propylene polymers), PPS (poly(phenylene sulfide), PEK (poly(ether ketone), PEEK (poly(ether-ether ketone), ECTFE (ethylene chloro trifluoro ethylene), PVDF (polyvinylidene fluoride), PTFE (polytetrafluoroethylene), PET (polyethylene terephthalate), POM (polyacetal), PA (polyamide), UHMW-PE (ultra high molecular weight polyethylene), PP (polypropylene), PE (polyethylene), HDPE (high density polyethylene), LDPE (low density polyethylene), PBI (polybenzimidizole), PAI (poly(amide-imide), poly(ether sulfone), poly(aryl sulfone), polyphenylenes, polybenzoxazoles, polybenzthiazoles, as well as blends and co-polymers thereof.

Compositions may be made by any suitable method. For instance, compositions can be made by melt mixing (compounding) the pre-polymer, the polymer and, optionally, additives, in a suitable device such as twin screw extruder at a suitable temperature, e.g., 250° C. to 450° C. Melt mixing is performed by mixing the composition components at a temperature sufficient to maintain the pre-polymer and the polymer in a molten state. The temperature is less than the degradation temperatures of the pre-polymer and the polymer. In some embodiments an extruder is used for melt mixing. Optionally, the extruder may have a vacuum vent. In some embodiments the pre-polymer and the polymer are melt mixed to form the polymer blend and additional components are added to the polymer blend. The polymer blend may be pelletized and then the polymer blend pellets melt mixed with additional components, or the additional components may be added to the polymer blend without a pelletizing step.

The pre-polymer may be present in an amount of 1 weight percent (wt %) to 99 wt %, or, more specifically, 10 wt % to 90 wt %, or, even more specifically, 20 wt % to 80 wt %, based on the combined weight of the pre-polymer and the polymer. The polymer may be present in an amount of 1 wt % to 99 wt %, or, more specifically, 10 wt % to 90 wt %, or, even more specifically, 20 wt % to 80 wt %, based on the combined weight of the pre-polymer and the polymer.

The compositions of the invention can be formed into articles by any number of methods. Preferred methods include, for example, injection molding, blow molding, compression molding, profile extrusion, sheet or film extrusion, sintering, gas assist molding, structural foam molding and thermoforming. Film and sheet extrusion processes may include and are not limited to melt casting, blown film extrusion and calendaring. Examples of such articles include, but are not limited to, films, membranes, tubing, composites, semi-conductor process tools, wire coatings and jacketing, fluid handling components, cookware, food service items, medical devices, trays, plates, handles, helmets, animal cages, electrical connectors, enclosures for electrical equipment, engine parts, automotive engine parts, bearings, lighting sockets and reflectors, electric motor parts, power distribution equipment, communication equipment, computers and the like, including devices that molded in snap fit connectors. The blends can also be used as fibers. In addition the blends can be used as coatings, for example powder coatings.

Films may have a thickness of 0.1 to 1000 micrometers in some instances. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction Compositions discussed herein may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.

2) Conforming the substrate to a mold configuration such as by forming and trimming a substrate into a three dimensional shape and fitting the substrate into a mold having a surface which matches the three dimensional shape of the substrate.

3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

The physical properties of the compositions, and articles derived from the compositions, are useful and can vary. For instance, in embodiments where the pre-polymer and the polymer comprise a common diamine, the polymer blend can have a single resin glass transition temperature.

When the polymer blend has a single glass transition temperature, the glass transition temperature can be greater than or equal to 100° C., or, more specifically, greater than or equal to 125° C., or, even more specifically, greater than or equal to 150° C. The glass transition temperature can be less than or equal to 600° C.

In embodiments where the pre-polymer and the polymer do not have a common monomer the compatible polymer blend has greater than one glass transition temperature. In some embodiments the composition has two glass transition temperatures. In some embodiments the lowest glass transition temperature is greater than or equal to 50° C., or, more specifically, greater than or equal to 75° C., or, even more specifically, greater than or equal to 100° C. The lowest glass transition temperature can be less than or equal to 600° C.

In some embodiments the polymer blend has a melt viscosity of 50 to 20,000 Pascal-seconds at 380° C. as measured by ASTM method D3835 using a capillary rheometer with a shear rate of 100 to 10,000 1/sec. Within this range the melt viscosity can be greater than or equal to 100, or, more specifically, greater than or equal to 200. Also within this range the melt viscosity can be less than or equal to 15,000, or, more specifically, less than or equal to 10,000 Pascal-seconds.

In another embodiment, the composition (and articles made from the composition) can have heat deflection temperature (HDT) of greater than or equal to 100° C., according to ASTM D648. In one embodiment, compositions can have an HDT of 100° C. to 400° C., according to ASTM D648. In another embodiment, the compositions, and articles derived from the compositions, can have a tensile strength of greater than or equal to 70 megaPascals (MPa) according to ASTM D638. In one embodiment, the compositions and articles can have a tensile strength of 70 MPa to 500 MPa. The coefficient of thermal expansion of the compositions can vary. In one embodiment, the coefficient of thermal expansion is less than 100 ppm/° C. from 30° C.-200° C. as measured by thermal mechanical analysis with a thermal ramp rate of 5° C./minute. In another embodiment, the coefficient of thermal expansion is 5 to 100 ppm/° C. from 30° C.-200° C. as measured by thermal mechanical analysis with a thermal ramp rate of 5° C./minute.

Compositions and articles derived from the compositions can also exhibit advantageous heat aging performance properties. For instance, in one embodiment, a composition (and articles derived from the composition) can have a continuous use temperature of greater than or equal to 150° C., or above. A composition can have a continuous use temperature of 150° C. to 400° C.

Advantageously, the compositions described herein now provide previously unavailable compositions and articles. For instance, the compositions can overcome the problem of delamination in an immiscible, incompatible blends and exhibit immiscible, but compatible blend features having highly useful applications. The compositions can provide a much wider range of miscible blend compositions. Compositions of the invention can exhibit an improved visual transparent appearance. Extending the range of miscibility in such blends has significant practical importance. It is now possible to make a wide variety of blend compositions with a single glass transition temperature (Tg) and pre-determined transparency.

The following examples are included to provide additional guidance to those skilled in the art. The examples provided are merely representative and are not intended to limit the invention, as defined in the appended claims, in any manner.

EXAMPLES

Materials used in the Examples are listed Table 1. Amounts listed in the Examples are in weight percent based on the combined weight of the first and second polymers used.

TABLE 1

| | |
|---|---|
| PEI 1 (ODPA/DAS) | A polyetherimide comprising structural units derived from oxydiphthalic anhydride and diamino diphenyl sulfone and having a molecular weight of 30,000 g/mol. |
| PEI 2 (BPADA/DDS) | A polyetherimide comprising structural units derived from bisphenol-A dianhydride and diamino diphenyl sulfone and having a molecular weight of 38,000 g/mol. This polymer is commercially available from GE Plastics under the tradename ULTEM XH6050. |
| PEI 3 (BPADA/MPD) | A polyetherimide comprising structural units derived from bisphenol-A dianhydride and meta-phenylene diamine and having a molecular weight of 38,000 g/mol. This polymer is commercially available from GE Plastics under the tradename ULTEM 1000. |
| Pre-Polymer (ODPA/DAS) | A polyetherimide comprising structural units derived from oxydiphthalic anhydride and diamino diphenyl sulfone, having a weight average molecular weight of 15,000 g/mol and a total reactive end group |

TABLE 1-continued content of 14 mole %.

Examples 1-9

The purpose of these examples is to show that blending with a reactive pre-polymer can overcome the problem of delamination in an immiscible, incompatible blend. These examples also show that blending with a reactive pre-polymer can improve the miscibility in an immiscible, but compatible blend and result in a much wider range of miscible blend compositions. The examples also show how visual appearance can also improve.

Preparation Techniques

The compositions shown in Table 2 were prepared by melt mixing the components in a twin screw extruder at temperatures of 300° C. to 430° C. with vacuum venting. The screw speed typically varied from 100 to 350 rotations per minute (RPM).

Testing Techniques

The compositions were tested for glass transition temperature using differential scanning calorimetry (DSC). Morphology was determined by visual inspection using injection molded ASTM tensile bars. The tensile bars were aged at 280° C. for 240 hours and checked for delamination by visual inspection. Visual inspection was determined by normal vision (e.g., 20/20 vision in the absence of any magnifying device with the exception of corrective lenses necessary for normal eyesight) at a distance of one half (½) meter. Results are shown in Tables 2 and 3.

Results

TABLE 2

| | Ex. 1 | Ex. 2 | Ex. 3 | Ex. 4* |
|---|---|---|---|---|
| Pre-Polymer (ODPA/DDS) | 85 | 75 | 60 | — |
| PEI 1 (ODPA/DDS) | — | — | — | 85 |
| PEI 3 (BPADA/MPD) | 15 | 25 | 40 | 15 |
| $T_g$ | 2 | 2 | 2 | 2 |
| Morphology | Two-Phase | Two-Phase | Two-Phase | Two-Phase |
| Appearance | Opaque | Opaque | Opaque | Opaque |
| Delamination on Heat Aging | No | No | No | Yes |

*Comparative example

TABLE 3

| | Ex. 5 | Ex. 6 | Ex. 7 | Ex. 8* | Ex. 9* |
|---|---|---|---|---|---|
| Pre-Polymer (ODPA/DDS) | 85 | 75 | 60 | — | — |
| PEI 1 | — | — | — | 85 | 60 |

TABLE 3-continued

|  | Ex. 5 | Ex. 6 | Ex. 7 | Ex. 8* | Ex. 9* |
|---|---|---|---|---|---|
| (ODPA/DDS) PEI 2 (BPADA/DDS) | 15 | 25 | 40 | 15 | 40 |
| $T_g$ | 1 | 1 | 1 | 2 | 2 |
| Morphology | One-Phase | One-Phase | One-Phase | Two-Phase | Two-Phase |
| Appearance | Transparent | Transparent | Transparent | Translucent | Translucent |
| Delamination on Heat Aging | No | No | No | No | No |

*Comparative examples

Discussion

Examples 1-3 (which are based on pre-polymers) when compared to Comparative Example 4 (which is not based on a pre-polymer) show the unexpected behavior of polyetherimide blends when a pre-polymer was used to make the blends. Blends of PEI 1 and PEI 3 exhibited two phase morphology and delamination even at low levels of PEI 3 (15 weight %). In contrast, despite the two phase resin morphology, blends of pre-polymer and PEI 3, even at 40 weight %, did not show delamination after heat aging at 280° C. for 240 hours. Surprisingly, melt mixing with a reactive pre-polymer overcame the problem of delamination in an immiscible, incompatible blend and resulted in an immiscible, but compatible blend of practical importance.

Examples 5-7 (which are based on pre-polymers) when compared to Comparative Examples 8 and 9 (which are not based on pre-polymers) illustrated the unexpected behavior of polyetherimide blends when a pre-polymer was used to make the blends. Blends of PEI 1 and PEI 2 showed two phase morphology at low levels of PEI 2 (15 weight %). Despite the multiphasic resin morphology, the blends of PEI 1 and PEI 2 did not show any delamination. In contrast, blends of pre-polymer and PEI 2 showed a monophasic morphology with a single Tg at the same levels of PEI 2 (15 weight %) and even at a high level of PEI 2 (40 weight %). No delamination after heat aging at 280° C. for 240 hours was observed in any of these blends.

The blend of Example 7 also demonstrated excellent properties. More particularly, the blend of Example 7 exhibited tensile strength of 120 MPa, flexural strength of 170 MPa, HDT of 240° C. under a load of 1.8 MPa, and a coefficient of thermal expansion of 45 ppm/° C. from 30-200° C.

Thus, Examples 5-7 showed that blending with a reactive pre-polymer improved the miscibility in an immiscible, but compatible blend and resulted in a much wider range of miscible blend compositions. The visual appearance also improved from translucent to transparent. Extending the range of miscibility in such a blend has significant practical importance since a wide variety of blend compositions with a single Tg and transparency could now be designed.

While the invention has been described with reference to several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims. All patents identified by number herein are incorporated by reference in their entirety.

What is claimed:

1. A composition comprising a polymer blend derived from:
    (a) a pre-polymer comprising
        structural units derived from an oxydiphthalic anhydride and a diamino diaryl sulfone, and
        a component selected from the group consisting of free amine groups, free anhydride groups, and combinations thereof; and
    (b) a polymer comprising
        structural units,
        end units, and
        a reactive group selected from the group consisting of reactive structural groups, reactive end groups, and combinations thereof;
    wherein the reactive group is reactive with the free anhydride groups, the free amine groups, or combinations thereof,
    wherein said reactive structural groups are reactive groups on said structural units and said reactive end groups are reactive groups on said end units,
    wherein the pre-polymer is an incompletely imidized oligomer, and
    wherein the polymer blend is non-delaminated.

2. The composition of claim 1, wherein the polymer is selected from the group consisting of polyimides, polyetherimides, polyamideimides, polyaryl ether ketones, polyaryl ketones, polyether ketones, polyether ether ketones, polyaryl sulfones, liquid crystal polymers, polyamides, polyesters, polysulfones, polyphenylene sulfides, polybenzimidazoles, polyphenylene ethers, and combinations of two or more of the foregoing.

3. The composition of claim 1, wherein the polymer blend has two glass transition temperatures and an article molded from the composition exhibits no delamination after aging at 280° C. for 240 hours.

4. The composition of claim 3, wherein the two glass transition temperatures are greater than or equal to 50° C.

5. The composition of claim 1, wherein the polymer blend has one glass transition temperature.

6. The composition of claim 5, wherein the one glass transition temperature is greater than or equal to 100° C.

7. The composition of claim 1, wherein prior to forming the polymer blend the pre-polymer is present in an amount of 1 weight percent to 99 weight percent, based on the combined weight of the pre-polymer and the polymer and the polymer is present in an amount of 1 weight percent to 99 weight percent, based on the combined weight of the pre-polymer and the polymer.

8. The composition of claim 7, wherein prior to forming the polymer blend the pre-polymer is present in an amount of 10 weight percent to 90 weight percent, based on the combined weight of the pre-polymer and the polymer and the polymer is present in an amount of 10 weight percent to 90 weight percent, based on the combined weight of the pre-polymer and the polymer.

9. The composition of claim 8, wherein prior to forming the polymer blend the pre-polymer is present in an amount of 20 weight percent to 80 weight percent, based on the combined weight of the pre-polymer and the polymer and the polymer is present in an amount of 20 weight percent to 80 weight percent, based on the combined weight of the pre-polymer and the polymer.

10. The composition of claim 1, wherein the polymer blend has a heat deflection temperature greater than or equal to 100° C. according to ASTM D648.

11. The composition of claim 1, wherein the polymer blend has a tensile strength above 70 MPa according to ASTM D638.

12. The composition of claim 1, wherein the polymer blend has a coefficient of thermal expansion of less than or equal to 100 ppm/° C. from 30° C.-200° C. as measured by thermal mechanical analysis with a thermal ramp rate of 5° C./minute.

13. The composition of claim 1, wherein the polymer blend has a continuous use temperature greater than or equal to 150° C.

14. The composition of claim 1, wherein the pre-polymer is essentially free of benzylic protons.

15. The composition of claim 1, wherein the pre-polymer has a ratio of carbon atoms/(nitrogen atoms+oxygen atoms+sulfur atoms) of 2.8 to 4.2.

16. An article comprising the polymer blend of claim 1.

17. A composition comprising a polymer blend derived from: ,
(a) a pre-polymer comprising
structural units derived from a first dianhydride and a first diamine, and
a component selected from the group consisting of free amine groups, free anhydride groups, and combinations thereof;
(b) a polymer comprising
structural units derived from a second dianhydride and a second diamine;
end units, and
a reactive group selected from the group consisting of reactive structural groups, reactive end groups, and combinations thereof;
wherein said reactive structural groups are reactive groups on said structural units and said reactive end groups are reactive groups on said end units;
wherein the pre-polymer is an incompletely imidized oligomer, wherein the polymer blend has a single glass transition temperature, and
wherein the first dianhydride and the second anhydride is the same and is selected from the group consisting of oxydiphthalic anhydrides, bisphenol-A dianhydrides, and combinations thereof.

18. A composition comprising a polymer blend derived from:
(a) a pre-polymer comprising
structural units derived from a first dianhydride and a first diamine, and
a component selected from the group consisting of free amine groups, free anhydride groups, and combinations thereof;
(b) a polymer comprising
structural units derived from a second dianhydride and a second diamine;
end units, and
a reactive group selected from the group consisting of reactive structural groups, reactive end groups, and combinations thereof;
wherein said reactive structural groups are reactive groups on said structural units and said reactive end groups are reactive groups on said end units;
wherein the pre-polymer is an incompletely imidized oligomer, wherein the polymer blend has a single glass transition temperature, and
wherein the first diamine and the second diamine is the same and is selected from the group consisting of diamino diaryl sulfones, metaphenylene diamines, paraphenylene diamines, and combinations thereof.

19. A composition comprising a polymer blend derived from:
(a) a pre-polymer comprising
structural units derived from a first dianhydride and a first diamine, and
a component selected from the group consisting of free amine groups, free anhydride groups, and combinations thereof; and
(b) a polymer comprising
structural units derived from a second dianhydride and a second diamine,
end units, and
a reactive group selected from the group consisting of reactive structural groups, reactive end groups, and combinations thereof;
wherein said reactive structural groups are reactive groups on said structural units and said reactive end groups are reactive groups on said end units;
wherein the pre-polymer is an incompletely imidized oligomer, and
wherein the polymer blend has greater than one glass transition temperature and an article molded from the composition is essentially free from delamination after aging at 280° C. for 240 hours, and wherein the first dianhydride, second dianhydride, or both the first and the second dianhydride is selected from the group consisting of oxydiphthalic anhydrides, bisphenol-A dianhydrides, and combinations thereof.

20. A composition comprising a polymer blend derived from:
(a) a pre-polymer comprising
structural units derived from an oxydiphthalic anhydride and a diamino diaryl sulfone, and
a component selected from the group consisting of free amine groups, free anhydride groups, and combinations thereof; and
(b) a polyetherimide polymer comprising
structural units derived from a bisphenol-A dianhydride and a diamino diaryl sulfone, wherein the diamino diaryl sulfone is the same in the pre-polymer and the polyetherimide polymer,
end units, and
a reactive group selected from the group consisting of reactive structural groups, reactive end groups, and combinations thereof;
wherein said reactive structural groups are reactive groups on said structural units and said reactive end groups are reactive groups on said end units;
wherein the pre-polymer is an incompletely imidized oligomer, and
wherein the polymer blend has a single glass transition temperature.

21. An article comprising the polymer blend of claim 20.

22. The composition of claim 20, wherein the one glass transition temperature is greater than or equal to 100° C.

23. The composition of claim 20, wherein prior to forming the polymer blend the pre-polymer is present in an amount of 10 weight percent to 90 weight percent, based on the combined weight of the pre-polymer and the polymer and the polymer is present in an amount of 10 weight percent to 90 weight percent, based on the combined weight of the pre-polymer and the polymer.

24. The composition of claim 20, wherein prior to forming the polymer blend the pre-polymer is present in an amount of 20 weight percent to 80 weight percent, based on the combined weight of the pre-polymer and the polymer and the polymer is present in an amount of 20 weight percent to 80 weight percent, based on the combined weight of the pre-polymer and the polymer.

25. The composition of claim 20, wherein the reactive group of the polymer is a reactive end group.

26. A composition comprising a polymer blend derived from:
   (a) a pre-polymer comprising
      structural units derived from an oxydiphthalic anhydride and a diamino diaryl sulfone, and
      a component selected from the group consisting of free amine groups, free anhydride groups, and combinations thereof; and
   (b) a polyetherimide polymer comprising
      structural units derived from a bisphenol-A dianhydride and a diamino diaryl sulfones,
      end units, and
      a reactive group selected from the group consisting of reactive structural groups, reactive end groups, and combinations thereof;
   wherein said reactive structural groups are reactive groups on said structural units and said reactive end groups are reactive groups on said end units;
   wherein the pre-polymer is an incompletely imidized oligomer,
   wherein the polymer blend has greater than one glass transition temperature, and
   wherein an article molded from the composition is essentially free from delamination after aging at 280° C. for 240 hours.

27. An article comprising the composition of claim 26, wherein the article is selected from the group consisting of films, membranes, tubing, composites, semi-conductor process tools, wire coatings and jacketing, fluid handling components, cookware, food service items, medical devices, trays, plates, handles, helmets, animal cages, electrical connectors, enclosures for electrical equipment, engine parts, automotive engine parts, bearings, lighting sockets and reflectors, electric motor parts, power distribution equipment, communication equipment, computers, devices have molded in snap fit connectors, and fibers.

28. The composition of claim 26, wherein the two glass transition temperatures are greater than or equal to 50° C.

29. The composition of claim 26, wherein prior to forming the polymer blend the pre-polymer is present in an amount of 10 weight percent to 90 weight percent, based on the combined weight of the pre-polymer and the polymer and the polymer is present in an amount of 10 weight percent to 90 weight percent, based on the combined weight of the pre-polymer and the polymer.

30. The composition of claim 26, wherein prior to forming the polymer blend the pre-polymer is present in an amount of 20 weight percent to 80 weight percent, based on the combined weight of the pre-polymer and the polymer and the polymer is present in an amount of 20 weight percent to 80 weight percent, based on the combined weight of the pre-polymer and the polymer.

31. The composition of claim 26, wherein the reactive group of the polymer is a reactive end group.

\* \* \* \* \*